United States Patent
Tsirkin et al.

(10) Patent No.: US 8,627,133 B2
(45) Date of Patent: Jan. 7, 2014

(54) VIRTUAL MACHINE BOOT SPEED-UP BY CLOCK ACCELERATION

(75) Inventors: Michael S. Tsirkin, Yokneam Yillit (IL); Gleb Natapov, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 387 days.

(21) Appl. No.: 12/972,671

(22) Filed: Dec. 20, 2010

(65) Prior Publication Data

US 2012/0159138 A1     Jun. 21, 2012

(51) Int. Cl.
*G06F 1/00*     (2006.01)
*G06F 9/24*     (2006.01)

(52) U.S. Cl.
USPC .............. 713/500; 713/1; 713/2; 713/400

(58) Field of Classification Search
USPC ............................................. 713/1, 2.4, 500
See application file for complete search history.

(56) References Cited

U.S. PATENT DOCUMENTS

| | | | |
|---|---|---|---|
| 8,327,357 B2* | 12/2012 | Amsden | 718/1 |
| 2007/0033589 A1* | 2/2007 | Nicholas et al. | 718/1 |
| 2008/0005551 A1* | 1/2008 | Swanson et al. | 713/2 |
| 2011/0010714 A1* | 1/2011 | Powell et al. | 718/1 |

* cited by examiner

*Primary Examiner* — Kim Huynh
*Assistant Examiner* — Zahid Choudhury
(74) *Attorney, Agent, or Firm* — Lowenstein Sandler LLP

(57) ABSTRACT

A mechanism for virtual machine (VM) boot speed-up by clock acceleration is disclosed. A method of the invention includes detecting that a VM managed by a hypervisor of a host machine is starting a boot up process, modifying a rate of a clock of the VM to speed up the boot up process, determining that the boot up process of the VM is complete, and returning the rate of the VM clock to a normal operational rate that is slower than the rate of the VM clock during the boot up process.

20 Claims, 4 Drawing Sheets

```
Detecting that a VM is booting up
                                              210

Modifying the rate of the VM clock to speed up to the boot up process of the VM
                                              220

Determining that the boot up process of the VM has ended
                                              230

Returning the rate of the VM clock to its pre-boot up rate
                                              240
```

VIRTUAL MACHINE BOOT SPEED-UP BY CLOCK ACCELERATION

TECHNICAL FIELD

The embodiments of the invention relate generally to virtualization systems and, more specifically, relate to virtual machine boot speed-up by clock acceleration.

BACKGROUND

In computer science, a virtual machine (VM) is a portion of software that, when executed on appropriate hardware, creates an environment allowing the virtualization of an actual physical computer system. Each VM may function as a self-contained platform, running its own operating system (OS) and software applications (processes). Typically, a hypervisor manages allocation and virtualization of computer resources and performs context switching, as may be necessary, to cycle between various VMs.

A host machine (e.g., computer or server) is typically enabled to simultaneously run multiple VMs, where each VM may be used by a local or remote client. The host machine allocates a certain amount of the host's resources to each of the VMs. Each VM is then able to use the allocated resources to execute applications, including operating systems known as guest operating systems. The hypervisor virtualizes the underlying hardware of the host machine or emulates hardware devices, making the use of the VM transparent to the guest operating system or the remote client that uses the VM.

As a result, VMs think that they are running on real hardware, when, in fact, this hardware is being emulated by the hypervisor. During boot up of the operating system (OS) of a VM, the VM will often use a timer-based strategy to activate hardware devices of the VM. For example, when looking for devices on the PCI bus, a request is sent to a potential device and then the VM waits for up to 0.5 second for the device to respond. A PCI bus may have up to 32 devices, so this could potentially cause a delay of 15 seconds for the VM. This is just wasted time in a virtualized scenario because hardware responses are always immediate from emulated hardware devices on the VM. In addition, any physically-installed hardware devices will be discovered before-hand by the hypervisor, so the VM will be aware of their existence upon boot up. There are many examples of hardware-related delays like this in working with emulated hardware of a VM. Prior solutions to this time-wasting scenario include having the VM detect that devices it is talking to are fast and then shortening the timeouts applied by the VM.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
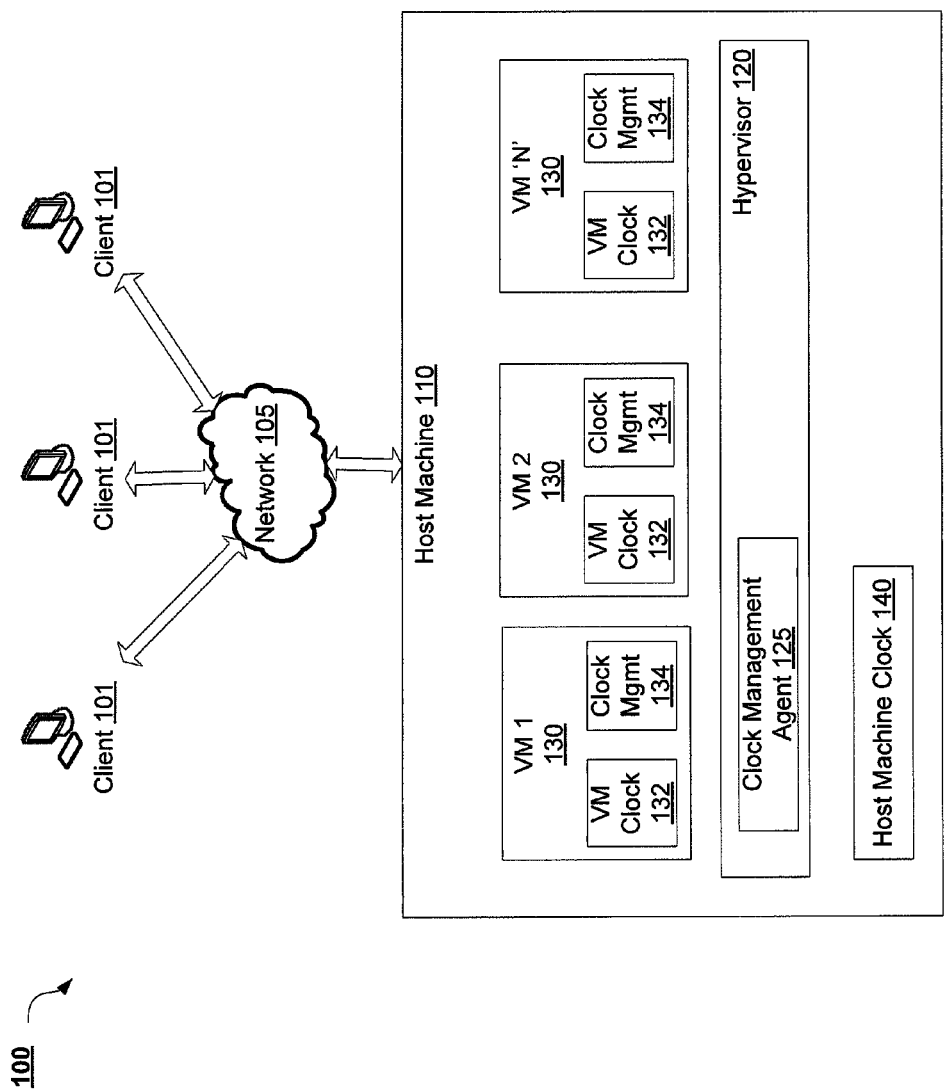
FIG. 1 is a block diagram of an exemplary network architecture in which embodiments of the present invention may operate.

Embodiments of the invention provide for virtual machine (VM) boot speed-up by clock acceleration. A method of embodiments of the invention includes detecting that a VM managed by a hypervisor of a host machine is starting a boot up process, modifying a rate of a clock of the VM to speed up the boot up process, determining that the boot up process of the VM is complete, and returning the rate of the VM clock to a normal operational rate that is slower than the rate of the VM clock during the boot up process.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "detecting", "modifying", "determining", "returning", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide a mechanism for VM boot speed-up by clock acceleration. During boot up of a virtual machine, much time is wasted in time outs for hardware discovery of emulated hardware. The solution proposed here involves no VM involvement, and instead delivers timer interrupts to the VM at a frequency higher than normal in order to make the VM boot faster. This accommodates the delays experienced for the emulated hardware discovery that is not necessary. In addition, the solution provides ways to return the VM clock back to "normal" after the VM boot up process has completed.

FIG. 1 is a block diagram of an exemplary network architecture 100 in which embodiments of the present invention may operate. The network architecture 100 includes a host machine 110 coupled to one or more clients 101 over a network 105. The network 105 may be a private network (e.g., a local area network (LAN), a wide area network (WAN), intranet, etc.) or a public network (e.g., the Internet). In one embodiment, host machine 110 may also be known as a host computing device. Typically, host machine 110 includes at least a processor and a memory. In some cases, host machine 110 may be a server computing device. In some embodiments, although not illustrated, clients 101 may be hosted directly by host machine 110 as a local client on host machine 110. Furthermore, there may be multiple host machines connected to network 105 and serving clients 101.

The clients 101 may include computing devices that have a wide range of processing capabilities. Some of the clients 101 may be thin clients, which have limited processing and memory capacities. For example, a thin client may a laptop computer, cellular phone, personal digital assistant (PDA), a re-purposed desktop computer, etc. Some of the clients 101 may be thick (fat) clients, which have powerful CPUs and large memory. For example, a thick client may be a dual-core or multi-core computer, workstation, graphics workstation, etc. The client 101 may run client applications such as a Web browser and a graphic user interface (GUI). The client 101 may also run other client applications, which receive multimedia data streams or other data from one or more host computers 110, 120 and re-direct the received data to a local display or other user interface.

As shown, host machine 110 may run one or more VMs 130. Each VM 130 runs a guest operating system (OS) that may be different from one VM to another. The guest OS may include, but is not limited to, Microsoft™ Windows™, Linux™, Solaris™, Macintosh™ OS, and so on. Furthermore, host machine 110 may include a hypervisor 120 that emulates the underlying hardware platform of host machine 110 for the VMs 130 that it hosts. The hypervisor 120 may also be known as a virtual machine monitor (VMM) or a kernel-based hypervisor. In some embodiments, the hypervisor 120 is part of a host operating system.

In one embodiment, each VM 130 can be accessed by the one or more of the clients 101 over the network 105. In one scenario, each VM 130 provides a virtual desktop for the client 101. From the user's point of view, the virtual desktop functions as a physical desktop (e.g., a personal computer) and is indistinguishable from a physical desktop.

A result of the above-described virtualization infrastructure is that the VMs 130 think that they are running on real hardware, when, in fact, this hardware is being emulated by the hypervisor 120. Conventionally, during boot up of the operating system (OS) of a VM 130, the VM 130 will often use a timer-based strategy to activate hardware devices of the VM. This can lead to wasted time in a virtualized scenario because hardware responses are always immediate from emulated hardware devices on the VM. In addition, any physically-installed hardware devices will be discovered before-hand by the hypervisor, so the VM will be aware of their existence upon boot up. As a result, waiting for responses from hardware during boot up is futile because if there is not an immediate response, then the hardware is not there.

Embodiments of the invention provide a solution that utilizes the hypervisor 120 to speed up the VM 130 boot up process. In embodiments of the invention, the hypervisor 130 detects VM boot and delivers timer interrupts at a frequency higher than normal. The result is to make VM boot faster.

Specifically, the hypervisor 120 includes a clock management agent 125 that can detect when any VM 130 of the host machine 110 is booting up. Upon detection of boot up of a VM 130, the clock management agent 125 modifies the rate of the VM clock 132. In one embodiment, the clock management agent 125 modifies the rate of VM clock 132 by delivering periodic interrupts to the VM 130. The more interrupts per second that are delivered to the VM 130, the more time that the VM 130 thinks has passed during an actual time interval.

In another embodiment, the clock management agent 125 returns modified clock value in response to guest querying the current time from VM clock 132. In this scenario, as part of a typical operation of the VM 130, the VM 130 queries the host machine 110 on how much time has passed by performing a special instruction to get timer information from the host 110, or doing I/O from an emulated clock device and then the hypervisor responds to this timer reading with modified clock information for the VM 130.

After the boot process is over, the VM clock 132 can be slowed down again and/or synchronized with the host machine 110 clock 140. This may be to address strange behavior of the VM for timeouts (quick timeouts) because the VM clock 132 is running faster, or to synchronize the clock with the host machine 110 for smoother interactions. In one embodiment, to detect that the VM clock 132 should be adjusted after boot up, one or more heuristics may be used by the clock management agent 125 to detect some activity that indicates that boot up has completed, such as activity on the network 105 or that a password has been entered.

In some embodiments, although it would mean having to update the VM 130 with additional programming, a clock management component 134 on the VM 130 may also be utilized to implement these discovery heuristics and communicate with the hypervisor 120 and clock management agent 125 regarding these heuristics.

Once it is detected that the VM clock 132 should be adjusted, the VM clock 132 may be returned to its normal rate. In one embodiment, to return the VM clock 132 to its normal rate, the VM clock 132 may be run at a slower than normal rate until it is synchronized with the host clock 140. Once synchronized, the VM clock 132 can then be run at a normal rate.

In another embodiment, the VM clock 132 may be moved back by setting the estimated boot time prior to the boot up process occurring. Then, after the VM clock speed-up strategies described above have been implemented during boot up, the VM clock 132 should be synchronized with the host machine clock 140. In this situation, the amount of time that the VM clock is run at the faster rate should be limited so that once synchronized after boot up, the VM clock 132 will not then speed ahead of the host clock 140 again.

In yet another embodiment, an end user of the VM 130 may be given control of the VM clock 132 in order to adjust its rate. In some case, the VM clock 132 may be controlled via the clock management component 134 of VM 130.

Figure 2:
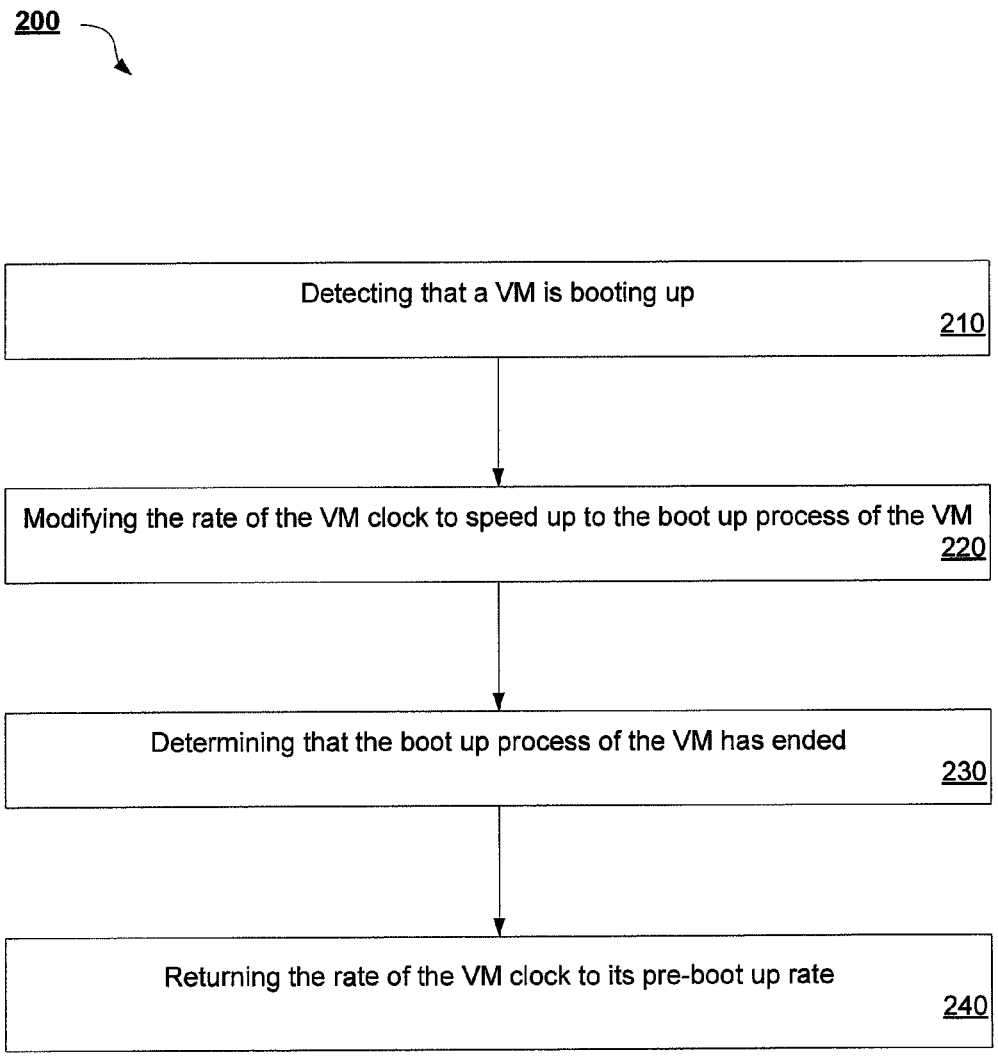
FIG. 2 is a flow diagram illustrating a method performed by a hypervisor for virtual machine (VM) boot speed-up by clock acceleration according to an embodiment of the invention.

FIG. 2 is a flow diagram illustrating a method 200 performed by a hypervisor for VM boot speed-up by clock acceleration according to an embodiment of the invention. Method 200 may be performed by processing logic that may comprise hardware (e.g., circuitry, dedicated logic, programmable logic, microcode, etc.), software (such as instructions run on a processing device), firmware, or a combination thereof. In one embodiment, method 200 is performed by hypervisor 120, and more specifically clock management agent 125, of FIG. 1.

Method 200 begins at block 210 where it is detected that a VM managed by the hypervisor is booting up. Then, at block 220 a rate of the VM clock is modified in order to speed up the boot up process of the VM. In one embodiment, the rate of VM clock is modified by delivering periodic interrupts to the VM. The more interrupts per second that are delivered to the VM, the more time that the VM thinks has passed during an actual time interval, resulting in a speed up of the VM clock. In another embodiment, the rate of the VM clock is modified by utilizing a timer instruction. In this scenario, as part of a typical operation of the VM, the VM queries the host machine on how much time has passed by performing a special instruction to get timer information from the host, or doing I/O from an emulated clock device and then the hypervisor responds to this timer reading with modified clock information for the VM.

Subsequently, at block 230, it is then determined that the boot up process of the VM has ended. In some embodiments, this determination is made by detecting certain activities being performed by the VM, such as communication over an external network or entering of a password, that indicate the boot up process has completed. In other embodiments, a clock management agent on the VM informs the hypervisor that the boot up process has ended.

Lastly, at block 240, the rate of the VM is returned to its pre-boot up rate in response to the determination that the boot up process has ended. In some embodiments, the VM clock may be run at a slower than normal rate until it is synchronized with a host machine clock. Once synchronized, the VM clock can then be run at a normal rate, for example, the same rate that the host machine clock is run at or the predetermined default rate of the clock. In another embodiment, the VM clock may be set back prior to the boot up process occurring by an estimated amount of time the boot up process will take. In yet another embodiment, an end user of the VM may be given control of the VM clock in order to adjust its rate.

Figure 3:
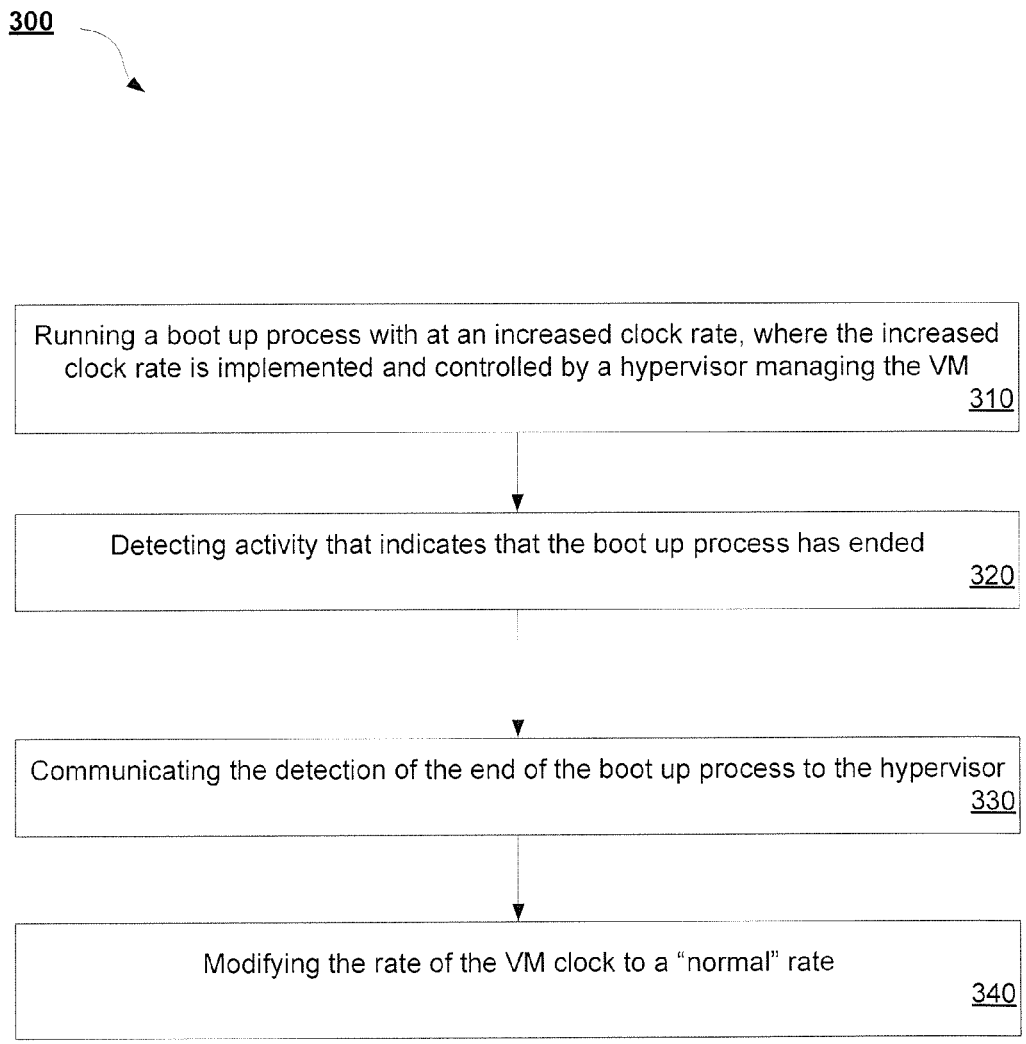
FIG. 3 is a flow diagram illustrating a method performed by a VM for VM boot speed-up by clock acceleration according to an embodiment of the invention.

FIG. 3 is a flow diagram illustrating a method 300 performed by a VM for VM boot speed-up by clock acceleration according to an embodiment of the invention. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by VM 130, and more specifically clock management component 134, of FIG. 1.

Method 300 begins at block 310 where a boot up process of a VM is run at an increase clock rate. The increased clock rate is implemented and controlled by a hypervisor managing the VM. For instance, the hypervisor may utilize periodic interrupts to the VM or timer instructions to speed up the clock rate of the VM. Then, at block 320, the VM detects activity that indicates that the VM process has ended. In one embodiment, software on the VM may enable this detection. In other embodiments, heuristics applied by the VM determine that the boot up process has ended.

At block 330, the VM communicates the detection of the end of the boot up process to the hypervisor. Lastly, at block 340, the rate of the VM clock is modified to a "normal" rate, such as the rate of the clock prior to the boot up process. In some embodiments, the VM itself may modify its clock rate to put it back to a "normal" rate after the boot up process has ended.

Figure 4:
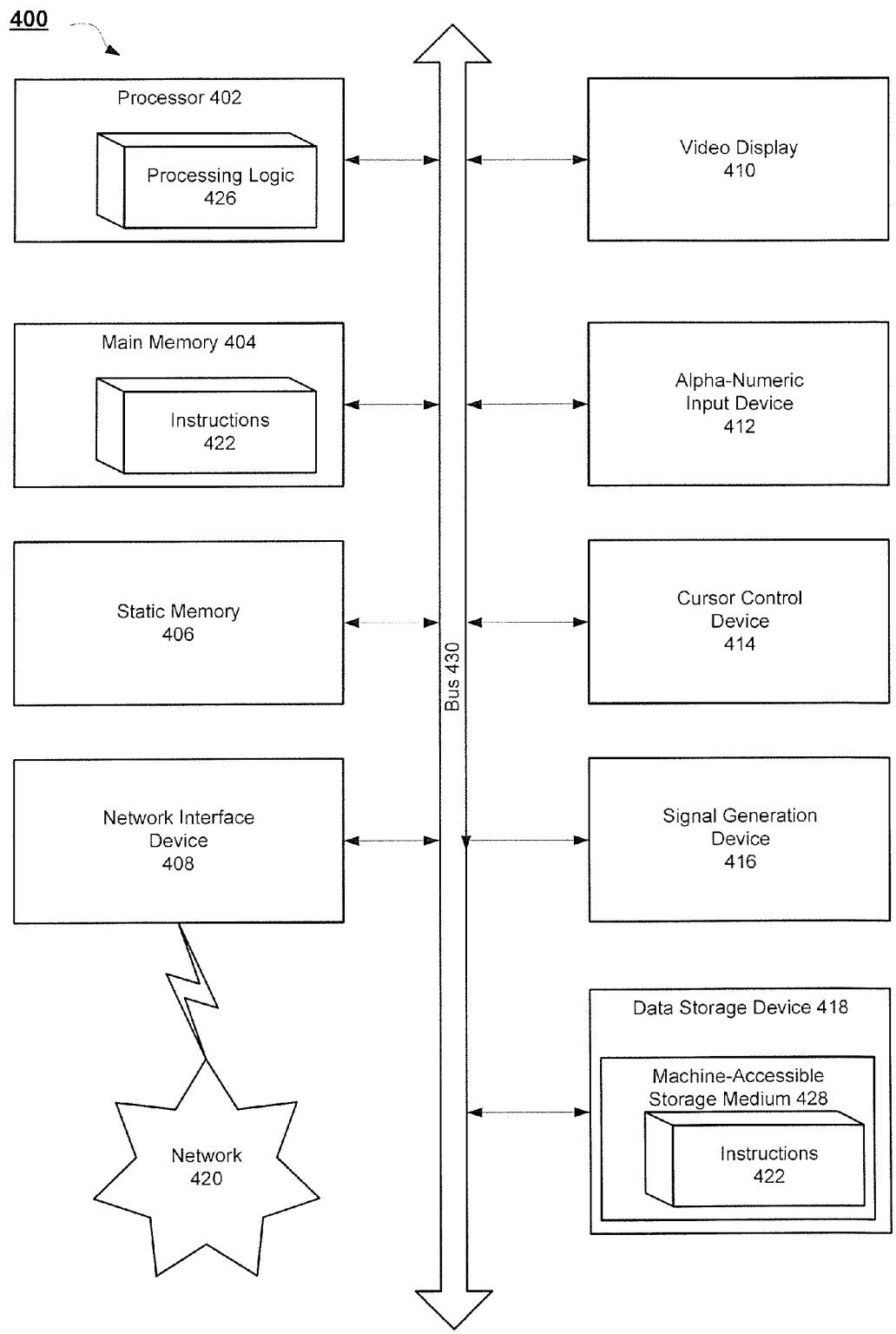
FIG. 4 illustrates a block diagram of one embodiment of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC)

microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 428 on which is stored one or more set of instructions (e.g., software 422) embodying any one or more of the methodologies of functions described herein. For example, software 422 may store instructions to perform VM boot speed-up by clock acceleration by hypervisor 120 described with respect to FIG. 1. The software 422 may also reside, completely or at least partially, within the main memory 404 and/or within the processing device 402 during execution thereof by the computer system 400; the main memory 404 and the processing device 402 also constituting machine-accessible storage media. The software 422 may further be transmitted or received over a network 420 via the network interface device 408.

The machine-readable storage medium 428 may also be used to store instructions to perform methods 200 and 300 for VM boot speed-up by clock acceleration described with respect to FIGS. 2 and 3, and/or a software library containing methods that call the above applications. While the machine-accessible storage medium 428 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:
 detecting, by a hypervisor executed by a processing device of a host machine, that a virtual machine (VM) managed by the hypervisor is starting a boot up process;
 modifying, by the hypervisor, a rate of a clock of the VM to speed up the boot up process;
 determining, by the hypervisor, that the boot up process of the VM is complete; and
 returning, by the hypervisor, the rate of the VM clock to a normal operational rate that is slower than the rate of the VM clock during the boot up process.

2. The method of claim 1, wherein modifying the rate of the VM clock comprises issuing a series of periodic interrupts to the VM.

3. The method of claim 1, wherein modifying the rate of the VM clock comprises responding with a clock value that is more advanced that the normal clock value by the VM at least one of executing a time instruction or performing input/output (I/O) from a clock device.

4. The method of claim 1, wherein detecting that the boot up process of the VM is complete comprises at least one of detecting activity of the VM on an external network or detecting a password entry by the VM.

5. The method of claim 1, wherein detecting that the boot up process of the VM is complete comprises allowing a pre-determined time interval to lapse after detecting the start of the boot up process.

6. The method of claim 1, wherein returning the rate of the VM clock to a normal operation rate comprises:
 running the VM clock at a slower than normal rate until the VM clock is synchronized with a clock of the host machine; and
 returning the VM clock to the normal rate when the VM clock is synchronized with the host machine clock.

7. The method of claim 1, wherein returning the rate of the VM clock to a normal operation rate comprises moving the VM clock back by setting an estimated boot up time prior to the boot up process occurring.

8. The method of claim 1, wherein software on the VM informs the hypervisor that the boot up process of the VM is complete and returns the rate of the VM clock to the normal operational rate.

9. A system, comprising:
 a processing device;
 a memory communicably coupled to the processing device; and
 a hypervisor to execute one or more virtual machines (VMs) from the memory that share use of the processing device, the hypervisor to:
  detect that a VM of the one or more VMs is starting a boot up process;
  modify rate of a clock of the VM to speed up the boot up process;
  determine that the boot up process of the VM is complete; and
  return the rate of the VM clock to a normal operational rate that is slower than the rate of the VM clock during the boot up process.

10. The system of claim 9, wherein modifying the rate of the VM clock comprises issuing a series of periodic interrupts to the VM.

11. The system of claim 9, wherein modifying the rate of the VM clock comprises responding with a clock value that is more advanced that the normal clock value by the VM at least one of executing a time instruction or performing input/output (I/O) from a clock device.

12. The system of claim 9, wherein detecting that the boot up process of the VM is complete comprises at least one of detecting activity of the VM on an external network, detecting a password entry by the VM, or allowing a pre-determined time interval to lapse after detecting the start of the boot up process.

13. The system of claim 9, wherein returning the rate of the VM clock to a normal operation rate comprises:
 running the VM clock at a slower than normal rate until the VM clock is synchronized with a clock of the host machine; and
 returning the VM clock to the normal rate when the VM clock is synchronized with the host machine clock.

14. The system of claim 9, wherein returning the rate of the VM clock to a normal operation rate comprises moving the VM clock back by setting an estimated boot up time prior to the boot up process occurring.

15. A non-transitory machine-readable storage medium including data that, when accessed by a processing device, cause the processing device to perform operations comprising:
 detecting, by a hypervisor executed by the processing device of a host machine, that a virtual machine (VM) managed by the hypervisor is starting a boot up process;
 modifying, by the hypervisor, a rate of a clock of the VM to speed up the boot up process;
 determining, by the hypervisor, that the boot up process of the VM is complete; and
 returning, by the hypervisor, the rate of the VM clock to a normal operational rate that is slower than the rate of the VM clock during the boot up process.

16. The non-transitory machine-readable storage medium of claim 15, wherein modifying the rate of the VM clock comprises issuing a series of periodic interrupts to the VM.

17. The non-transitory machine-readable storage medium of claim 15, wherein modifying the rate of the VM clock comprises responding with a clock value that is more advanced that the normal clock value by the VM at least one of executing a time instruction or performing input/output (I/O) from a clock device.

18. The non-transitory machine-readable storage medium of claim 15, wherein detecting that the boot up process of the VM is complete comprises at least one of detecting activity of the VM on an external network, detecting a password entry by the VM, or allowing a pre-determined time interval to lapse after detecting the start of the boot up process.

19. The non-transitory machine-readable storage medium of claim 15, wherein returning the rate of the VM clock to a normal operation rate comprises:
 running the VM clock at a slower than normal rate until the VM clock is synchronized with a clock of the host machine; and
 returning the VM clock to the normal rate when the VM clock is synchronized with the host machine clock.

20. The non-transitory machine-readable storage medium of claim 15, wherein returning the rate of the VM clock to a normal operation rate comprises moving the VM clock back by setting an estimated boot up time prior to the boot up process occurring.

* * * * *